March 5, 1968  F. G. PATTERSON ET AL  3,371,398

METHOD OF MAKING PLAIN SPHERICAL BEARINGS

Filed Aug. 3, 1965

INVENTORS
FRANCIS G. PATTERSON
RONALD E. RESTELLI
WARREN A. RIVAL
BY Hopgood & Calimafde
ATTORNEYS.

United States Patent Office 3,371,398
Patented Mar. 5, 1968

3,371,398
METHOD OF MAKING PLAIN
SPHERICAL BEARINGS
Francis G. Patterson, Plainville, Ronald E. Restelli, Cromwell, and Warren A. Rival, Kensington, Conn., assignors to The Fafnir Bearing Company, New Britain, Conn.
Filed Aug. 3, 1965, Ser. No. 476,806
8 Claims. (Cl. 29—149.5)

ABSTRACT OF THE DISCLOSURE

In the production of a plain spherical bearing, a truncated metal pusher ball is employed to prepare an outer ring for receiving a finished truncated bearing ball. The pusher ball is inserted endwise in the opening of the outer ring which has a spherical inner surface or raceway. The pusher ball is then rotated so that it nests in the raceway. The pusher ball is then pushed out of the outer ring, whereby to form a pair of deformed lips on the outer ring. The finished bearing ball is inserted into the outer ring via the lips thereof, and the lips thereafter closed.

---

This invention relates to plain spherical bearings and, in particular, to a method of assembling plain spherical bearings, rod end bearings and the like.

A plain spherical bearing comprises an outer ring having a concave spherical inner surface in which a ball-shaped member is rotatably mounted. Heretofore, such bearings employed different forms and shapes of inserts between the ball-shaped member and the surrounding race member, such as split inserts, in order to rotatably lock the ball-shaped member in place. The use of such inserts imposes a relatively high cost to the bearing, as well as time-consuming operations in the assembly of the bearing. Moreover, the resulting structure is limited as to the forces that can be applied to the bearing in actual use.

Another prior method comprised making the outer ring of sufficient bore to receive the ball and then filling the gap with malleable metal capable of being formed by pressure or swaging so as to provide concave surfaces to serve as a raceway for the ball. Another method is to hot or cold swage the outer ring about the ball member. However, these and other prior methods have not always been uniformly satisfactory in use.

It is an object of this invention to provide a plain spherical bearing without using inserts or in swaging the outer ring but in which only a restricted portion of the outer ring is deformed during the assembly of the complete bearing.

Another object is to provide a method for producing a plain spherical bearing.

A further object is to provide a method of assembling a plain spherical bearing in which the outer ring may be hardened during one stage of the operation independent of the ball, but in which the ball can still be precision mounted without the use of inserts or other structural elements for rotatably locking the ball in place.

These and other objects will more clearly appear when taken together with the following disclosure and the accompanying drawing, wherein.

In carrying the invention into practice, we start with an outer ring of ductile metal having a rough machined concave spherical inner surface or socket. We then provide a pusher ball or plug having oppositely disposed end faces spherically contoured and dimensioned to nest snugly within the socket of the outer ring, the cross section of the pusher ball between the end faces having a maximum diameter corresponding substantially to the entrance diameter of the ring opening such that the pusher ball can be slip-fitted endwise into the opening of the ring. The pusher ball or plug is inserted endwise into the opening of the outer ring and rotated 90° until the oppositely disposed spherical end faces nest snugly into the socket with proper anvil support for the ring face. A force is then applied to the pusher ball or plug sufficient to force it out of the socket, whereby a pair of protruding lips is formed at the opposite side of the ring opening by means of which a truncated plain spherical bearing ball can be inserted into the socket in a subsequent operational step in making a complete bearing. The socket of the outer ring, when necessary, is then finish machined or ground and the previous step repeated prior to insertion of the truncated ball; heat treated or otherwise surface treated such as depositing dry film lubricant, abrasion resistant coating, or the like, if desired, and, after inserting the ball, the lips then closed in followed by an appropriate facing finishing operation. In may be desirable in some instances to add a spherical race grind to the process after sizing by a second pusher ball.

An advantage of the foregoing method over prior methods is that the outer ring can be made from complex iron-base, nickel-base, cobalt-base and other heat resisting alloys which are normally very difficult to swage without resorting to very high temperatures, or which otherwise cannot be swaged by practical convention means due to unusual external product geometry. An example of an alloy to which the invention is particularly suited in making an outer ring is one referred to in the trade as A-286 having a composition comprising about 0.08% carbon, 1.35% manganese, 0.50% silicon, 15% chromium, 26% nickel, 1.25% molybdenum, 2.0% titanium, 0.25% aluminum, 0.3% vanadium and the balance iron. This alloy has particular use in the production of aircraft plain spherical bearings subjected in use to elevated temperatures. As the alloy is used in the age hardened condition at hardnesses of about 25 to 35 $R_C$, we find that the novel method of manufacture enables carrying out the finishing steps while the alloy is in the hardened condition.

Figure 1:
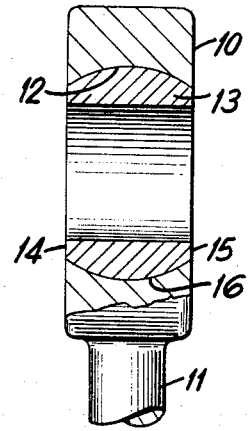
FIG. 1 shows in cross section, partially broken away, one embodiment of a plain spherical bearing of the type referred to as a rod end bearing.

Referring now to the drawing, FIG. 1 is illustrative of one type of plain spherical bearing known in the trade as a rod end bearing comprising an outer ring 10 integral with a shank 11, the ring having a bore 12 formed as a concave spherical inner surface to provide a raceway or socket. Rotatably mounted in the raceway is a truncated spherical ball member 13 having oppositely disposed flat faces 14 and 15 and an outer spherical face 16 nesting within the socket of the outer ring. In producing a bearing of this type, or other comparable types of plain spherical bearings, we may employ a pusher ball or plug of the type shown in FIGS. 2 to 4. As illustrated in the figures, the pusher ball 13A is in effect a truncated ball having oppositely disposed spherical end faces 17 and 18 and side faces comprising cylindrical faces 19, 20 and 21 located between flat side faces 22, 23 and 24. Looking at the cross section of FIG. 4, it will be noted that the cylindrical side faces all have the same diameter D, the diameter as shown being the maximum diameter of the cross section and corresponding substantially to the entrance diameter of the bore of the outer ring illustrated in FIG. 5. That is to say, the maximum diameter of the cross section of the pusher ball will be several thousandths of an inch less than the entrance diameter of the bore so that the ball can be easily slip-fitted endwise into the bore. Preferably, though not necessarily, the pusher ball has at least one flat side face against which force applying means can be applied substantially perpendicular to the flat face, or, depending on the product desired, the pusher may be at a small angle to the axis. As will be appreciated, the pusher ball should have a properly blended corner radius to avoid the setting up of cracks in the ring.

Figure 5:
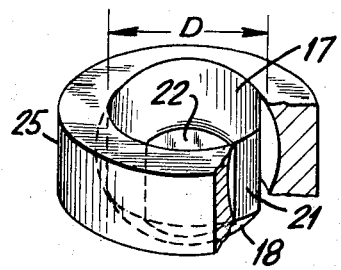
FIGS. 5 and 6 depict two stages in the mounting of a pusher ball in an outer ring having a spherically contoured raceway.
Figure 6:
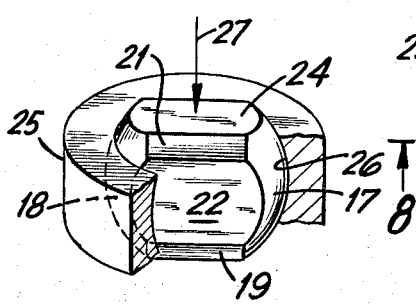

The outer ring into which the pusher ball is inserted is machined or ground (that is the spherical I.D.) from a metal in the soft condition. The dimensions of the spherical I.D. should be sufficient to accommodate a pusher ball having an undersize tolerance of about 0.002 inch. If an age hardenable alloy, such as that known in the trade as A-286, is employed as the outer ring material, it may be used in the solution heat treated or annealed condition, generally known as the dead soft condition, or in the age hardened condition. The spherical I.D. of the bore has substantially the same sphericity as the spherical end faces of the pusher ball which, as stated above, is slightly undersize, such that when the pusher ball is inserted endwise into outer ring 25 of FIG. 5 and rotated 90° as shown in FIG. 6, the spherical end faces nest into socket 26. As will be obvious to those skilled in the art, the length of the pusher ball is substantially equal to the spherical diameter of the inner raceway of the outer ring such that on rotating the inserted pusher ball, the spherical end faces slide into the raceway.

Figure 7:
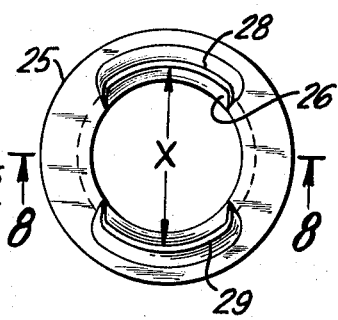
FIGS. 7 and 8 show the outer ring of FIG. 6 deformed at a restricted portion of one end free after forcing out the pusher ball.
Figure 8:
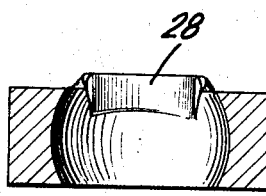
Figure 9:
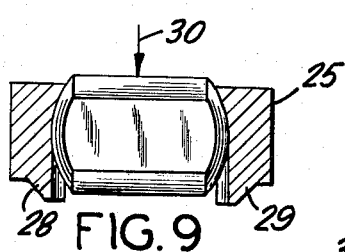
FIG. 9 depicts a sizing step in which another pusher ball is employed for enlarging the restricted opening of the deformed end face preparatory to completing the assembling of the final bearing ball.

After the 90° position shown in FIG. 6 is assumed by the pusher ball, a force 27 is applied to flat face 24 sufficient to push out the ball and form a flared opening defined by a pair of oppositely disposed deformed lips 28 and 29 at the other side of the ring opening. The force may be applied by any well known means, such as a mandrel or arbor mounted on an hydraulic press. The flared opening X shown in FIG. 7 may then be further widened in a subsequent operational step after the ring has been age hardened. The ring of A-286 alloy material is age hardened to a hardness of about 35 $R_C$ by heating at a temperature of about 1350° F. for about 12 to 16 hours and then air cooled. Thereafter, it is finish machined and the race turned or ground to size. A full sized pusher ball (note FIG. 7) may then be inserted as in FIG. 5 and rotated 90° as in FIG. 6 to assume the position shown in FIG. 7. A force 30 is then applied to the full sized pusher ball to force it out of the socket and further flare out lips 28 and 29. Of course, it will be appreciated that several combinations of steps may be employed in carrying out the invention. For example, the ring may first be in the age hardened condition and the pusher ball pushed through it, followed by finish machining or grinding, which in turn is followed by another push out.

Figure 10:
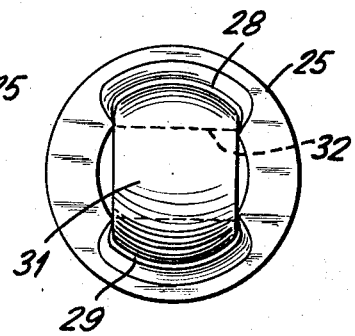
FIG. 10 is a top view showing the insertion of a hollow truncated ball into the flared mount of the outer ring.

The finished outer ring is now ready to receive a finish ground truncated hollow or solid ball 31, the width of which is accommodated by the width of lips 28 and 29 as shown in FIG. 10. The truncated ball is inserted by pressure and then turned 90° so that its bore 32 is concentric with the bore of the ring and the ball rests in home position. The ball may comprise a martensitic chromium steel composition of the type known in the trade by the designation 410, or 440C, or similar steels.

Figure 11:
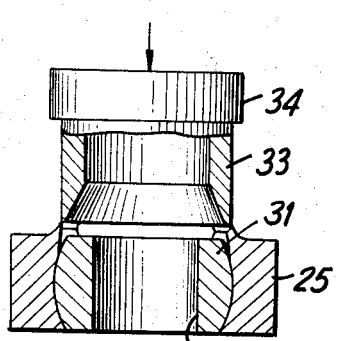
FIG. 11 shows a cylindrically shaped staking tool for closing the deformed end face of the outer ring.

After the ball has been inserted, the assembled bearing is placed on its flat undeformed face and the flared lips pressed back into place by means of a circular tool 33 (FIG. 11) via a force applied to plate 34 of a hydraulic press. A staking tool with a sharp edge is applied to the same face to close the residual gap between the lips or slots and the spherical O.D. of the ball. Some incipient cracking may occur when the lips are flattened, but these are removed by machining away the excess metal on the face of the outer ring. During the finish machining step, the ball can be pushed axially to free it from any binding. As will be readily understood, other freeing methods may be employed.

While it is preferred to produce the bearing using several pusher steps, it will be appreciated that a one step method could be employed. For example, one method comprises providing a full size pusher ball which is inserted into the outer bearing ring which has been heated to an elevated temperature. After inserting the pusher ball, it is rotated into socket position, the outer ring cooled down to room temperature, and the ball then pushed out to provide a full-sized socket.

Another method comprises providing a full size pusher ball which is then super-cooled to a sub-atmospheric temperature, e.g., sub-zero temperature, the cooled ball then inserted and positioned into the socket of the outer ring which is at room or a high temperature. The cooled ball is then allowed to heat up to the temperature of the outer ring and then pushed out to provide a full-sized socket. Where necessary, the pusher ball may be slightly oversize to allow for metal spring-back. However, where the method is employed in which the pusher ball and the outer are at room temperature, we find it advantageous for our purpose to use several pusher steps, followed by the usual finishing operations.

In producing an eyebolt rod end bearing, it may be desirable to produce the finished outer in the soft condition, the outer being hardenable by heat treatment. Thereafter, a full sized hard ball which will resist heat treatment temperatures (e.g., tungsten carbide balls, or a ball of an alloy of cobalt, chromium, tungsten and the like which will resist oxidation) is inserted, the deformed lips of the eyebolt outer closed in, and the resulting assembly finish machined, followed by heat treatment of the outer with the ball in place.

While the method herein has been described relative to the production of an outer ring from an A-286 alloy, it will be appreciated that the method is not limited to such metals but may be applied to any ductile metals, including those which are not age hardenable. We have found, however, that the method is particularly adapted to high temperature alloys which are difficult to swage without resorting to higher swaging temperatures.

Examples of other heat resistant, age hardenable iron-base alloys to which the method is applicable in the production of the outer ring are given as follows: the alloy known in the trade as Discaloy comprising about 0.06% C, 1.0% Mn, 0.7% Si, 14% Cr, 26% Ni, 3.0% Mo, 1.7% Ti, 0.25% Al and the balance iron; and the alloy known in the trade as Incoloy 901 comprising about 0.05% C, 0.5% Mn, 0.35% Si, 13% Cr, 40% Ni, 6.0% Mo, 2.5% Ti, 0.2% Al, and the balance iron. These alloys are heat treated by solution quenching from an elevated temperature and then followed by age hardening at a lower temperature. In the case of the alloy known by the designation A-286, it is solution heat treated by oil quenching from 1800° F., then reheated to the age hardening temperature of 1350° F. where it is soaked until fully hardened, and then air cooled to room temperature. In the case of Incoloy 901, it is solution treated at 2050° F. and thereafter age hardened at 1300° F.; while Discaloy is solution treated at 1800° F. and then followed by a double aging treatment, to wit, at 1325° F. followed by air cooling and then reheated to 1200° F. followed by air cooling.

In addition to heat resistant iron-base alloys, age-hardenable, heat resistant nickel-base alloys may be employed in the manufacture of the outer ring such as: the alloy known in the trade as Inconel X comprising about 0.04% C, 0.7% Mn, 0.3% Si, 15% Cr, 73% Ni, 1% Cb, 2.5% Ti, 0.9% Al, and 0.7% Fe; the alloy known in the trade as Inconel 700 comprising about 0.13% C, 0.08% Mn, 0.25% Si, 15% Cr, 45% Ni, 3% Mo, 30% Co, 2.2% Ti, 3.2% Al, and 1% Fe; and the alloy known as Rene 41 comprising about 0.1% C, 19% Cr, 10% Mo, 11% Co, 3.0% Ti, 1.5% Al, 3% Fe, trace amounts of boron and the balance nickel. Heat resistant cobalt-base alloys may similarly be employed.

In heat treating the foregoing nickel-base alloys, Inconel X is solution treated by air cooling from 2100° F. and age hardened by reheating to 1550° F. followed by air cooling and then reheated to 1300° F. followed by air cooling; Inconel 700 is solution treated by air cooling from 2160° F. and then reheated to 1600° F. followed by air cooling; and finally Rene 41 is solution treated by air cooling from 2150° F. and then age hardened at 1650° F. followed by air cooling.

As stated hereinabove, the truncated ball bearing may be made of martensitic chromium steel, such as 410 and 440 C. In the case of 410, the composition comprises 0.15% C max., 1% Mn max., 1% Si max., 11.5 to 13.5% Cr. and the balance iron. With regard to 440 C which is a high carbon, high chromium steel, it contains 0.95% to 1.2% C, 1.0% Mn max., 1.0% Si max., 16 to 18% Cr, 0.75% Mo max., and the balance iron. These steels are hardened by air cooling or oil quenching from 1850° F.

Figure 2:
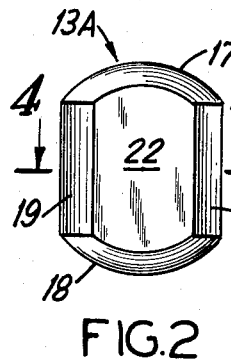
FIGS. 2 to 4 are illustrative of a pusher ball or plug employed in carrying out the method aspects of the invention, FIG. 4 being a cross section taken along line 4—4 of FIG. 2.
Figure 3:
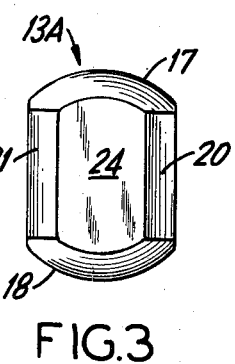
Figure 4:
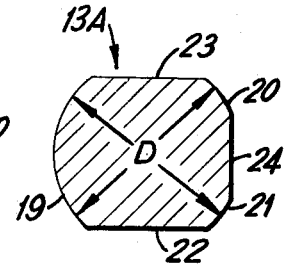

Although the push ball shown in FIGS. 2 to 4 show the opposite end faces to be substantially completely spherical, it will be appreciated that the end faces need not be wholly spherical so long as at least a substantial portion of each surface is spherical and will provide the necessary metal displacement during push out. For example, the leading face of the pusher ball which passes through the ring during push-out may be provided with a conical bevel which extends into the spherical end faces to provide adequate contact surface for displacing metal during push-out.

Figure 12:
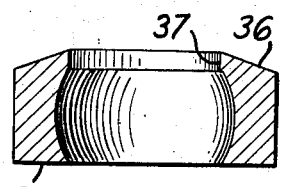
FIG. 12 depicts another form of an outer ring which may be employed in carrying out the invention.

It may be desirable that the side face of the outer ring through which the leading face of the pusher ball is pushed be shaped to provide additional excess metal to be pushed back with the staking tool. In this connection, reference is made to FIG. 12 which shows an outer ring 35 having one face 36 slightly conical in shape to provide an annular shoulder 37 which provides additional excess metal together with the lips formed by the pusher ball.

The terms "finish machined" or "finish machining," "machined" and similar terms employed herein are meant to include any operation, such as turning, grinding, lapping, as well as those machining operations in which deformation of a metal surface is involved.

An advantage of the invention is that superior control of surface finish of the concave spherical surface is obtainable as compared to conventionally swaged or otherwise formed assemblies where, for example, rough orange-peel type finishes remain which act as stress raisers and abrading defects.

Another advantage of the invention is that the pressure exerted by the staking tool in pushing back excess metal at the face of the deformed outer ring may also be used to control the form of the spherical race of the outer ring and additionally to assure predetermined radial and axial fit between the race and the finished truncated ball.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of preparing an outer ring of a plain spherical bearing which comprises, providing an outer ring of ductile metal having a bore forming a concave spherical inner surface, providing a metal pusher ball having a side face and opposite end faces at least a portion of each face being spherically contoured and dimensioned to nest snugly within the concave spherical inner surface of said outer ring, the cross section of said pusher ball intermediate said end faces having a maximum diameter corresponding substantially to the entrance diameter of the bore such that the pusher ball can be slip-fitted endwise into the bore of said ring, inserting said pusher ball endwise into the bore and rotating it so that the spherical end face portions nest snugly into the concave spherical inner surface of the ring, and then applying a force against the pusher ball at its side face to expel said ball from the ring, whereby a pair of deformed lips is formed at the opposite side of the ring through which a truncated plain spherical bearing ball can be inserted in a subsequent step for making a complete bearing.

2. A method of preparing an outer ring of a plain spherical bearing which comprises, providing an outer ring of ductile metal having a bore forming a concave spherical inner surface, providing a truncated metal pusher ball having at least one flat side face and end faces at least a portion of each face being spherically contoured and dimensioned to nest snugly within the concave spherical inner surface of said outer ring, the cross section of said truncated ball between said end faces having a maximum diameter corresponding substantially to the entrance diameter of the bore such that the truncated ball can be slip-fitted endwise into the bore of said ring, inserting said truncated ball endwise into the ring opening and rotating it so that the spherical end faces nest snugly into the concave spherical inner surface of the ring and a flat face is exposed across the bore, and then applying a force against said flat face to expel said truncated ball from the ring, whereby a pair of deformed lips is formed at the opposite side of the ring through which a truncated plain spherical bearing ball can be inserted in a subsequent step for making a complete bearing.

3. A method of assembling a plain spherical bearing which comprises, providing a machined outer ring of hardenable ductile metal having a bore forming a concave spherical inner surface, providing a truncated metal pusher ball having at least one flat side face and opposite end faces at least a portion of each face is spherically contoured and dimensioned to nest snugly within the concaved spherical inner surface of said outer ring, the cross section of said truncated ball between said end faces having a maximum diameter corresponding substantially to the entrance diameter of the bore such that the truncated ball can be slip-fitted endwise into the bore of said ring, inserting said truncated ball endwise into the ring opening and rotating it so that the spherical end faces nest snugly into the concave spherical inner surface of the ring, then applying a force against the said flat face to expel said truncated ball from the ring, and form a pair of deformed lips at the opposite side of the ring, finishing the bore of said ring, inserting a truncated hollow spherical bearing ball into the bore via the lips thereof and rotating said ball into home position, closing said lips and finish machining the face thereof.

4. The method of claim 3 wherein the outer ring is made of hardenable metal and wherein said ring is hardened after the bore is finish ground and before the spherical bearing ball is inserted.

5. The method of claim 3 wherein the spherical ball inserted in the ring is a hard metal resistant to heat treating temperatures and wherein the assembled bearing is heat treated with the ball in position.

6. A method of assembling a plain spherical bearing which comprises, providing a machined outer ring of ductile metal having a bore forming a concave spherical inner surface, providing a first truncated metal pusher ball having at least one flat side face and opposite end faces spherically contoured and dimensioned to nest snugly within the concaved spherical inner surface of said outer ring, the cross section of said truncated ball between said end faces having a maximum diameter corresponding substantially to the entrance diameter of the bore such that the truncated ball can be slip-fitted endwise into the bore of said ring, inserting said truncated ball endwise into the ring opening and rotating so that the spherical end faces nest snugly into the concave spherical inner surface of the ring, then applying a force against said flat face to expel said truncated ball from the ring and form a pair of deformed lips at the opposite side of the ring, finish machining the bore of said ring, providing a second pusher ball similar to the first pusher ball but corresponding to the finish size of the finished bore, inserting said second pusher ball endwise into the bore and rotating the same to nest into the concave inner surface of the bore, applying a force to said pusher ball to expel it past the previously deformed lips, inserting a truncated hollow bearing ball into said bore via the lips thereof and rotating said ball into its home position, closing said lips and finish machining the face thereof.

7. The method of claim 6 wherein the outer ring is made of hardenable material and wherein said ring is hardened after the finish grinding step and before the second pusher ball is inserted therein.

8. The method of claim 6 wherein the outer ring is made of hardenable material and wherein said ring is hardened before it is finished machined and before the second pusher ball is inserted therein.

References Cited
UNITED STATES PATENTS

| | | | |
|---|---|---|---|
| 881,471 | 3/1908 | Hoffman | 29—148.4 |
| 2,382,349 | 8/1945 | Taylor | 72—378 X |
| 3,179,477 | 4/1965 | Carter | 308—72 |
| 2,546,976 | 4/1951 | Clark et al. | 29—447 X |
| 3,116,539 | 1/1964 | Evans et al. | 29—149.5 |

THOMAS H. EAGER, *Primary Examiner.*